United States Patent

[11] 3,581,068

| [72] | Inventor | Robert D. Wyatt |
| | | Costa Mesa, Calif. |
| [21] | Appl. No. | 791,536 |
| [22] | Filed | Jan. 7, 1969 |
| [45] | Patented | May 25, 1971 |
| [73] | Assignee | the United States of America |

[54] COUNTER CONTROLLED DIGITAL LIMIT DETECTOR
6 Claims, 1 Drawing Fig.

[52] U.S. Cl. ........................................... 235/92,
307/222, 328/44, 340/421
[51] Int. Cl. ........................................ G06m 3/14,
G06m 3/02
[50] Field of Search .......................... 235/92, 70,
66, 30, 65, 29, 60, 63, 74; 307/222; 328/44, 48

[56] References Cited
UNITED STATES PATENTS
2,730,300  1/1956  Savino ..................... 235/92U Primary Examiner—Maynard R. Wilbur
Assistant Examiner—Joseph M. Thesz, Jr.
Attorneys—Joseph C. Warfield, John W. Pease and John Miller ABSTRACT: A main counter of "$n$" stages counts in an additive direction and an auxiliary counter of "$n$" stages counts in an additive direction to gate $2^n - 1$ pulses into the main counter to effect a subtraction in a digital limit detector system. Alarm generating circuitry is activated when the count in the main counter reaches a preset number representing a limit in a monitored device.

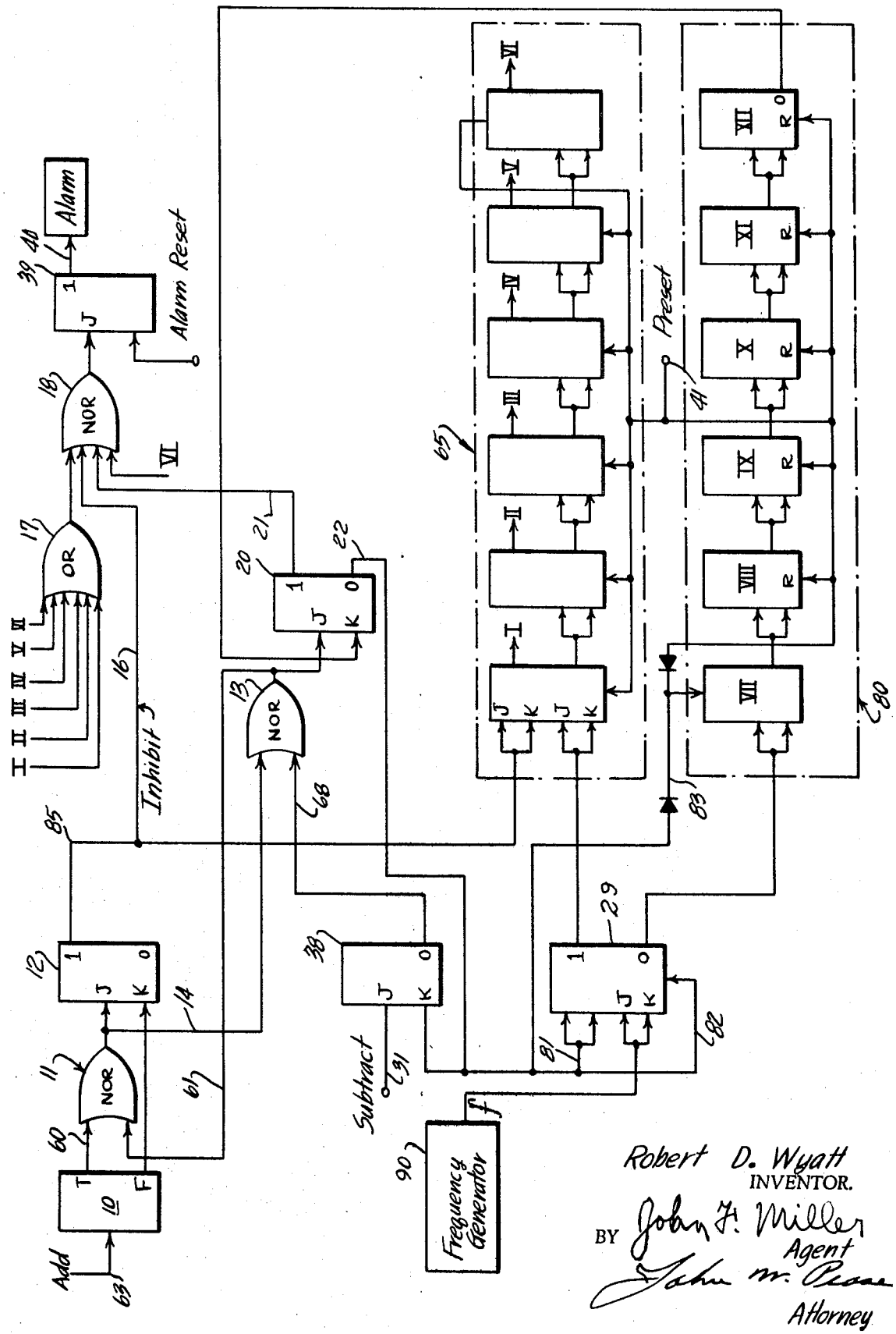

COUNTER CONTROLLED DIGITAL LIMIT DETECTOR

BACKGROUND OF THE INVENTION

The invention is in the field of digital limit detector systems. In the prior art numerous error detecting and/or limit detecting systems have been devised to monitor digital equipment of various sorts. These have in general functioned satisfactorily, but have been of such complexity that they have added materially to the initial and maintenance costs of the monitored apparatus. Applicant has solved this long standing problem of excessive costs and complexity in the prior art devices by inventing a simple and versatile digital limit detecting circuit which reliably activates alarm means without materially increasing the cost or complexity of the monitored apparatus.

SUMMARY OF THE INVENTION

An alarm system for warning the operator of digital equipment when the number of marks stored therein exceeds or is less than predetermined limits. A main counter is arranged to store an additional count when the monitored digital equipment stores an additional mark. An auxiliary counter measures a pulse frequency which is additively counted in the main counter to decrease the count stored therein when a stored mark leaves the monitored equipment. Output leads from the several stages of the main counter are connected to gating means to control the gating of an alarm signal when the counter counts to a predetermined condition representing a limit in the monitored equipment.

BRIEF DESCRIPTION OF THE DRAWING

The drawing shows a block diagram of the invention.

DESCRIPTION OF THE PREFERRED EMBODIMENT

The apparatus of the invention is shown in the drawing. Assuming that the invention is used to monitor the number of marks or "1"s stored in an associated digital apparatus at a particular time, the invention is connected to the monitored apparatus in such manner that when a mark enters the monitored apparatus, a "1" is added to the count in a main counter 65, and when a mark leaves the monitored apparatus, a "1" is subtracted from the count in 65. Main counter 65 is comprised of the cascaded flip-flops I, II, III, IV, V, and VI.

A "1" to be added to the count in 65 appears as a positive pulse on an add input line 63 to a one shot multivibrator 10 which transmits a lengthened and shaped positive pulse on add line 60 to one input of an add NOR gate 11. If there is a "0" signal on a line 61 to the other input of NOR gate 11, the gate will transmit a signal to the "J" input of an add flip-flop 12 which will forward an add pulse from its "1" output over a line 85 to the upper "J" and "K" inputs of flip-flop I, which is the first or lowest order stage of the flip-flop chain comprising main counter 65. Accordingly, a "1" is added to the count standing in 65 in a manner well known in the art. There will be a "0" signal on input lead 61 to NOR gate 11 unless there is a coincident subtract signal on a subtract input lead 31. When the input pulse on line 60 terminates, the flip-flop 12 is reset by the NOR output of one shot multivibrator 10.

When a mark leaves the monitored apparatus, a subtract signal is caused to appear on subtract input lead 131 to the "J" input of a first subtract flip-flop 38 which transmits a "0" signal on its "0" output lead 68 to a subtract NOR gate 13. NOR gate 13 will transmit a "1" signal to a second subtract flip-flop 20 if there is no "1" signal from NOR gate 11 on the lead 14 to the other input of NOR gate 13 due to the presence of an add signal on add input lead 63. Flip-flop 20 will be set to apply a "1" output signal to an inhibit lead 21 connected to an alarm NOR gate 18 and a "0" signal to a lead 22. The "0" signal on lead 22 goes to the "K" input of flip-flop 38 where it has no effect, to input lead 81 to the upper "J" and "K" inputs of a flip-flop 29, to reset lead 82 of flip-flop 29, and over a lead 83 to the set input of a flip-flop VII where it has no effect. Flip-flop VII is the first or lowest order one of the cascaded chain of flip-flops VII, VIII, IX, X, XI, and XII, comprising an auxiliary counter 80. A frequency generator 90 is arranged to generate a frequency $f$ which is divided in flip-flop 29 to furnish the divided frequency $f/2$ to the lower "J" and "K" inputs of flip-flops I and VII in main counter 65 and auxiliary counter 80 respectively during the presence of a "0" signal on lead 22 from subtract flip-flop 20.

The arrangement is such that flip-flop I of main counter 65 receives its first signal to be counted before flip-flop VII of auxiliary counter 80. This is necessary to prevent a false alarm signal, as will be explained presently. When counter 80, which has been initially preset to a one count for reasons to be explained, counts through its capacity, the last flip-flop XII in the chain switches from "1" to "0" and develops an output signal on the "0" output lead 37 to switch flip-flop 20 to the opposite condition to remove the "0" signal from lead 22. This inhibits flip-flop 29 with a "1" signal on its upper "J" and "K" inputs and stops the counting process in counters 65 and 80. Main counter 65 has now counted the same number of pulses as auxiliary counter 80. It will have stored therein a number equal to one less than the number originally stored, that is, a "1" has been subtracted from the count stored in 65. This avoids the propensity for error which sometimes afflicts directly reversible counters. Flip-flop 38 is also switched thereby changing the output of NOR gate 13 on lead 61 to NOR gate 11, which enables the system to receive another add signal in the manner previously described. The output of flip-flop 29 on the lower inputs of flip-flop I makes main counter 65 receptive to an add signal from flip-flop 12.

Assume now that main counter 65 has been set to a number near the center of its range and that auxiliary counter 80 has been set to a one count. The outputs of the flip-flops comprising the main counter 65 are connected to respective inputs of an alarm OR gate 17 as illustrated by the output leads from respective flip-flops I, II, III, IV, V, and VI. These will each pass a "0" signal to OR gate 17 which passes a "0" signal to an alarm NOR gate 18 when all of the main counter flip-flops contain "0"s. Flip-flop VI is also connected to an input of NOR gate 18 and at the termination of an add pulse (which causes gate 18 to be inhibited by a "1" signal on lead 16 from the output of flip-flop 12) and providing there is an "0" signal on lead 21 from flip-flop 20, gate 18 will transmit a "1" signal to the "J" input of an alarm flip-flop 39. This sets flip-flop 39 and produces an alarm signal on an output lead 40 which is connected to an alarm 100. Alarm 100 warns the operator of the apparatus that the established limit has been exceeded. If a subtract pulse were to appear on subtract input 131 while an add pulse is present on add input lead 63, it will set flip-flop 38 but will have no further effect since NOR gate 13 is inhibited by a signal on lead 14 from NOR gate 11 during the add pulse. At the termination of the add pulse the "0" output from flip-flop 38 will cause the setting of flip-flop 20 which produces an inhibiting "1" signal on output lead 21 to NOR gate 18. However, this requires some 20 nanoseconds. Gate 18 passes a "1" to flip-flop 39 in about 6 nanoseconds. The alarm flip-flop 39 will be set because the adding process and main counter checking operation will have been completed before the inhibit signal appears on lead 21.

While a subtract operation is in progress, the "1" signal on output lead 21 from flip-flop 20 inhibits NOR gate 18 to prevent a false alarm caused by all of the main counter flip-flops passing through the "0" state. If all of the main counter flip-flops are in the "0" state at the end of the subtract operation, an alarm signal will be generated in the manner described. This is so because when the "0" signal on lead 37 from flip-flop XII resets flip-flop 20, a "0" signal will be present on lead 21, output leads from flip-flops I, II, III, IV, V, and VI, and lead 16. The resetting of flip-flop 20 results in the resetting of subtract flip-flop 38 because of the signal on lead 22.

A preset device 41 is connected by the leads shown to the counter flip-flops to optionally preset counters 65 and 80 to a desired count in a manner well known in the art. This can be done manually or automatically as by termination of the alarm signal by resetting alarm flip-flop 39, as is well known. In the disclosed embodiment counter 80 is automatically preset to a one count at the end of every subtract operation by the signal from flip-flop 20 which passes over leads 22 and 83 to the set input of flip-flop VII. Leads such as 83 could be connected to any flip-flop or flip-flops desired to automatically preset counter 80 to any desired count.

Applicant has disclosed a digital limit detector which overcomes many of the problems besetting prior art systems. It is versatile in that it can be readily modified to serve a great variety of applications by simply switching presetting connections, alarm gating connections, and/or changing the number of counter stages. It avoids the lack of reliability sometimes associated with reversible counters by employing an auxiliary counter to effect subtraction in an additive main counter. The counter input gating circuitry has been reduced to the logical minimum necessary to accommodate coincident additive and subtractive input signals. The alarm gating circuitry has been reduced to the logical minimum necessary to avoid false alarms while insuring a response to over-limit signals.

I claim:

1. In a digital alarm system, the improvement comprising:
    an alarm means for monitoring a digital apparatus, activating means for activating said alarm means when a digital quantity in said digital apparatus exceeds predetermined limits, said activating means comprising a main counter, an auxiliary counter, gating means controlled by said main counter for gating a signal to said alarm means when said digital quantity exceeds predetermined limits, means for incrementing and decrementing the count in said main counter, said decrementing means including said auxiliary counter,
    add signal input means for said incrementing means and a subtract signal input means for said decrementing means, means for inhibiting an alarm signal while an add signal is present, means for inhibiting an alarm signal while said subtract signal is present,
    said decrementing means including a frequency generator, means for transmitting a pulse frequency from said frequency generator to said main counter and to said auxiliary counter to be counted therein, means for terminating the counting of said frequency when said auxiliary counter counts to a predetermined condition,
    means for presetting said auxiliary counter to a predetermined condition when said counting of said frequency is terminated,
    said add signal input means including a shaping multivibrator for shaping and transmitting said add signal to a first input of an add NOR gate, an add flip-flop connected to receive said add signal from said add NOR gate, said main counter being connected to receive said add signal from said add flip-flop, and inhibiting means connected to a second input of said add NOR circuit, whereby an add signal is inhibited when there is a subtract signal at said subtract signal input means.

2. The apparatus of claim 1, said subtract signal input means including a first subtract flip-flop for receiving a subtract signal, a subtract NOR gate with a first input connected to receive said subtract signal from said first subtract flip-flop, a second subtract flip-flop connected to receive said subtract signal from said subtract NOR gate and to transmit a control signal to said means for transmitting a pulse frequency from said frequency generator to said main counter and to said auxiliary counter, and inhibiting means connected to a second input of said subtract NOR gate, whereby a subtract signal is inhibited when there is an add signal at said add signal input means.

3. The apparatus of claim 2, wherein said means for transmitting a pulse frequency comprises a flip-flop connected to receive said pulse frequency from said frequency generating means and to distribute alternate pulses of said frequency to said main counter and to said auxiliary counter respectively.

4. The apparatus of claim 3, said means for inhibiting an alarm signal comprising an alarm NOR gate, inhibiting means connected from said add flip-flop to a first input of said alarm NOR gate, inhibiting means connected from said second subtract flip-flop to a second input of said alarm NOR gate, an alarm OR gate, (inhibiting means connected from the output of said alarm OR gate to a third input of said alarm NOR gate, inhibiting means connecting the outputs of respective stages of said main counter to respective inputs of said alarm OR gate, whereby said alarm NOR gate is inhibited from transmitting an alarm signal during the presence of an add signal, a subtract signal, or an inhibiting signal from any stage of said main counter.

5. The apparatus of claim 4, and including inhibiting means connected from the last stage of said main counter to a fourth input of said alarm NOR gate, whereby said alarm NOR gate is inhibited from passing an alarm signal when said last stage of said main counter is in a selected state.

6. The apparatus of claim 5, said alarm means including an alarm flip-flop connected to receive a signal from said alarm NOR gate, said means for terminating the counting of said frequency including means connecting an output of the last stage of said auxiliary counter to an input of said second subtract flip-flop, whereby said second subtract flip-flop is reset to inhibit said counting when said last stage of auxiliary counter changes from a first state to a second state.